Patented Apr. 4, 1950

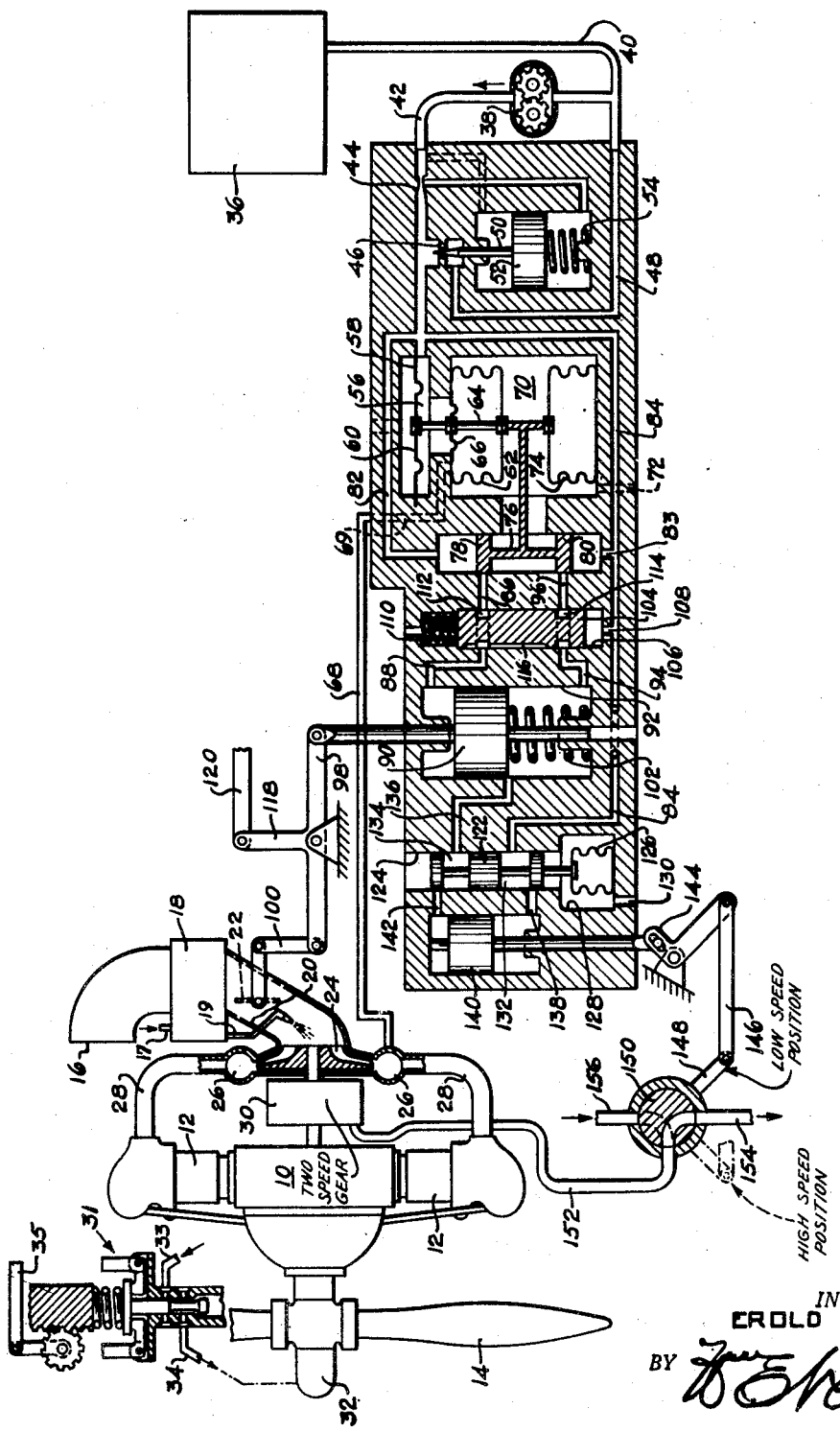

2,502,987

UNITED STATES PATENT OFFICE 2,502,987

AUTOMATIC POWER CONTROL

Erold F. Pierce, Paterson, N. J., assignor to Wright Aeronautical Corporation, a corporation of New York Application March 13, 1946, Serial No. 654,196

6 Claims. (Cl. 123—103)

This invention relates to engine power control systems and is particularly directed to a system in which a predetermined relation between engine speed and engine power is automatically maintained. Also, the invention is particularly directed to the provision of means for automatically maintaining the speed of a multi-speed supercharger at its minimum value until the engine throttle valve reaches a substantially full open position. In a conventional aircraft engine, the speed and manifold pressure of the engine are separately controlled. For best operation, however, as the engine manifold pressure is increased, the engine speed generally is also increased. The relation between engine speed and manifold pressure for best overall engine and aircraft performance and efficiency depends on the particular engine and aircraft installation. The control system of the present invention provides a predetermined relation between engine manifold pressure and speed and the operator only needs to set the engine speed control to the desired value, whereupon the control system automatically adjusts the manifold pressure for best engine operation. In this way, the pilot is relieved of the task of properly coordinating engine speed and manifold pressure.

It is also common practice to provide aircraft engines with multi-speed superchargers. It is a further object of this invention to provide a control system for automatically regulating the speed of the supercharger in such a manner that the supercharger speed is maintained at its minimum value until the engine throttle is substantially fully open. Also, with the present invention, the speed of the supercharger is not increased until the aircraft attains a predetermined altitude. Accordingly, the speed of the supercharger can be maintained at its minimum value below a predetermined altitude regardless of the position of the engine throttle valve.

Other objects of this invention will become apparent upon reading the annexed detailed description in connection with the drawing which discloses a schematic view of the control system of the present invention as applied to an aircraft engine.

In the accompanying drawing the control system is shown partly in section applied to an internal combustion engine.

Referring to the drawing, 10 indicates a conventional aircraft engine having a plurality of cylinders 12 and an aircraft propeller 14 driven by said engine. The engine air for combustion is taken in through an air scoop 16 communicating with a carburetor 18 which proportions the rate at which fuel is supplied to the engine to the rate of airflow. Thus, the carburetor may control the rate at which fuel is supplied to the engine from a conduit 17 through a conduit 19 into a duct 20. As an alternative construction, the fuel may be supplied directly to the various engine cylinders as is also common practice. From the carburetor 18, the engine air or combustion mixture is transmitted through the duct 20 and past a throttle valve 22 therein to the intake end of an engine driven supercharger 24. The supercharger 24 compresses the air or combustion mixture into an annular manifold 26 from which it is supplied to the various engine cylinders through intake pipes 28. The supercharger 24 is driven by the engine 10 through a two speed gear or transmission 30—for example, such as illustrated in United States Patent No. 2,034,087 issued March 17, 1936, to R. Chilton. Any two speed transmission may be substituted for the transmission 30. The propeller is provided with conventional means 32 for changing the pitch angle of the propeller blades and any conventional governor 31 is provided for controlling the pitch of the propeller blades for regulating the speed of the engine. The governor 31 illustrated generally is similar to the centrifugal governor disclosed in Patent No. 2,204,640 to E. E. Woodward. Thus, the governor controls the application of a fluid pressure from a fluid pressure source 33 to a passage 34 communicating with the pitch changing mechanism 32. The particular speed setting of the governor is subject to manual control by the pilot through the lever 35.

The control system for the engine throttle comprises a container 36 for a suitable stable liquid such as kerosene, naphtha or engine lubricating oil. A positive displacement type pump 38 driven from the engine 10 is in communication with the bottom of the container through a conduit 40 and the pump 38 is disposed below the container so that it is always submerged in the liquid. With this construction, the speed of the pump is proportional to the speed of the engine and therefore the mass flow rate of the liquid delivered by the pump is substantially a straight line function of engine speed and is substantially independent of aircraft altitude, at least up to presently used altitudes.

The pump discharges liquid into a conduit 42 having a venturi 44. A valve port 46 is disposed in a passage 48 establishing communication between the inlet side of the pump 38 and the downstream end of the venturi 44. A needle-like valve member 50 is movable through the port 48 and is carried by a piston 52. The pressure differential of the venturi 44 is transmitted to the opposite sides of the piston 52 for urging the piston in a valve opening direction against a spring 54.

With this arrangement, the pressure differential acting on the piston 52, and therefore the position of the needle valve 50, is a function of the rate at which liquid is delivered by the pump and therefore is also a function of engine speed. Accordingly, at any engine speed, the needle valve 50 can be profiled to give any desired valve opening and, therefore, any desired pump discharge pressure. That is, since the position of the needle valve 50 is a function of engine speed, the profile of the needle valve may be designed to provide any desired relation between engine speed and the pump discharge pressure which increases with increase in engine speed.

The discharge pressure of the pump 38 communicates with a chamber 56 through the pump outlet passage 42 and a passage 58. The chamber 56 is provided with a flexible diaphragm 60 on the side of the chamber 56 remote from a flexible bellows 62. The bellows 62 and diaphragm 60 are connected together by a rod 64 passing through a small sealing diaphragm 66 separating the interior of the bellows from the chamber 56. The interior of the bellows 62 is in communication with the engine intake manifold pressure through a conduit 68 and a passage 69. The bellows 62 is disposed in a chamber 70 vented by a drain 72. A partially evacuated sealed bellows 74 is also disposed in chamber 70 and is connected to the rod 64 to resist expansion of the bellows 62.

The rod 64 is connected to a servo valve 76 provided with lands 78 and 80. Passage 82 and passages 83 and 84 connect opposite ends of the servo valve 76 with the discharge outlet 42 of the pump 38. The arrangement is such that, when the valve 76 moves downwardly, liquid pressure is admitted from the passage 82 to passages 86 and 88 normally communicating with the upperside of a piston 90 slidable within a cylinder 92. At the same time, passages 94 and 96 normally communicating with the underside of the piston 90 are placed in communication with the interior of the vented chamber 70. Accordingly, when the servo valve 76 moves downwardly from the position illustrated, liquid pressure is normally admitted to the upperside of the piston 90 to move the piston downwardly. Similarly, when the servo valve 76 is moved upwardly, liquid pressure is normally admitted to the underside of the piston 90 from passages 84 and 83 and through passages 96 and 94 to move the piston 90 upwardly. The piston 90 is connected to the throttle valve 22 by a lever 98 and link 100 so that upward movement of the piston effects opening adjustment of the throttle valve 22 and vice versa. A spring 102 is provided for urging the throttle valve 22 toward its open position.

With this arrangement, and at a given engine speed, the throttle valve 22 is automatically controlled by the engine manifold pressure by means of the bellows 62. For example, any increase in engine manifold pressure results in expansion of the bellows 62 thereby moving the servo valve 76 downwardly to admit liquid pressure to the upperside of the piston 90 which thereby effects a closing adjustment of the engine throttle to reduce the engine manifold pressure to its former value.

Expansion of the bellows 62 in response to increase in engine manifold pressure is opposed by the liquid pressure within the chamber 56 acting on the diaphragm 60. As previously described, the pressure within the chamber 56 is a function of engine speed and preferably increases with increase in engine speed. Accordingly, at a particular manifold pressure, if the engine speed increases, the servo valve 76 is moved upwardly to admit liquid pressure to the underside of the piston 90 thereby opening the throttle valve 22 and increasing the manifold pressure. Similarly, upon a decrease in engine speed, the pressure in the chamber 56 decreases and the servo valve 76 moves downwardly to admit liquid pressure to the upperside of the piston thereby effecting a closing adjustment of the throttle valve 22 and reducing the engine manifold pressure.

The above described operation of the control system of the present invention is similar to the operation of a conventional manifold pressure regulator except the pressure within the chamber 56 acting against the diaphragm 60 opposes the expansion of the bellows 62 thereby providing a variable pressure datum for the manifold pressure regulator, which datum is determined by the speed of the engine. With this system, any desired relation between engine manifold pressure and engine speed may be obtained by the design of the needle valve 50. Furthermore, since the torque output of the engine is substantially proportional to the engine manifold pressure, the design of the valve 50 controls the relation between engine torque and engine speed.

The sealed bellows 74 also opposes the expansion of the manifold pressure bellows 62 thereby providing for adjustment of the engine throttle valve 22 with changes in altitude as is common in conventional manifold pressure regulators. Also, it should be noted that any adjustment of the throttle valve 22 to vary the rate of air flow results in the carburetor effecting a corresponding adjustment in the fuel flow.

Preferably, a valve 104 slidable within a bore 106 is interposed between passages 86 and 88 and the passages 94 and 96. Pressure is transmitted to the underside of the valve 104 through a passage 108 from the passage 84 to urge the valve 104 upwardly against a spring 110 and against a shoulder provided by a reduced upper portion of the bore 106. The valve 104 is provided with a pair of annular grooves 112 and 114. In the upper and normal position of the valve during engine operation, the groove 112 establishes communication between passages 86 and 88 and the groove 114 establishes communication between passages 94 and 96.

At low engine speeds, the liquid pressure output of the pump 38 is insufficient to hold the valve 104 against the spring 110. Thereupon, the spring 110 moves the valve downwardly to disconnect passages 86 and 96 from passages 88 and 94 respectively. Accordingly, at low engine speeds, manifold pressure control of the throttle valve 22 is rendered inoperative. However, the valve 104 is provided with a longitudinal groove 116 on its one side adapted to bridge the passages 88 and 94 when the valve 104 is in its lowered position. Therefore, when the valve is in its lowered position, the opposite sides of the piston 90 are in communication with each other through passages 88 and 94 and the longitudinal groove 116. Accordingly, the throttle valve 22 may be manually adjusted at low engine speeds. To this end, a lever 98 is provided with an arm 118 to which a link 120 is connected for operation by the pilot.

With this arrangement, the pilot can set the throttle valve to any desired position when the engine is being started. Furthermore, the pilot can adjust the throttle valve during engine idling operation at which time the engine manifold pressure may be erratic. Above a predetermined engine speed, the valve 104 is moved upwardly by the output pressure of the pump 38 whereupon the throttle valve 22 is positioned automatically in response to changes in engine manifold pressure, engine speed and altitude.

A servo valve 122 slidable within a bore 124 is provided for controlling the speed ratio of the transmission 30. The valve 122 is connected to a sealed bellows 126 disposed in a chamber 128 vented by a drain passage 130. Accordingly, the bellows 126 is arranged to move the servo valve 122 upwardly with increase in altitude and vice versa.

The valve 122 is provided with a pair of spaced annular grooves 132 and 134 communicating respectively with a liquid pressure passage 84 and a passage 136. The passage 136 communicates with the cylinder 92 and is arranged to be uncovered by the piston 90 just before or as the piston 90 moves the throttle valve 22 to its full open position whereupon liquid pressure is admitted from the lower portion of the cylinder 92 into the passage 136.

With the valve 122 in the position illustrated, liquid pressure is admitted from the passage 84 to a passage 138 to the underside of a piston 140 thereby holding or moving the piston 140 to its upper position as illustrated in the drawing. When the aircraft altitude exceeds a predetermined value, a valve 122 moves upwardly to place passage 136 in communication with passage 142 leading to the upperside of the piston 140. If, at this time, the throttle valve 22 is substantially fully open and liquid pressure is being admitted to the underside of the piston 90, then liquid pressure will be admitted to the top of the piston 140 through passages 136 and 142 to move the piston 140 downwardly.

The piston 140 is connected by a bell crank lever 144 and link 146 to a valve arm 148 of a valve 150. With the piston 140 in its upper position, as illustrated, the valve 150 is arranged to connect a passage 152 to a drain passage 154 whereupon the transmission 30 is in its low speed ratio. When the piston 140 is moved to the lower end of its stroke, the valve arm 148 is moved to its dotted line position whereupon fluid pressure is admitted from a conduit 156 to the conduit 152 to shift the transmission 30 to its high speed ratio thereby increasing the speed of the supercharger 24. With this control of the supercharger 24, the supercharger is automatically maintained in low speed until the throttle valve reaches a substantially full open position and until a predetermined altitude is reached.

With the aforedescribed control, the engine throttle valve 22 is automatically adjusted to maintain a manifold pressure determined by the engine speed. In this way, it is only necessary for the pilot to set the engine governor for the desired engine speed whereupon the control automatically adjusts the throttle valve 22 for the manifold pressure and engine power corresponding to that particular speed in accordance with the design of the needle valve 50. In addition, automatic means are provided for controlling the speed of the supercharger so that the supercharger is maintained at low speed until the throttle valve reaches a substantially full open position and a predetermined altitude is reached.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. Power regulating means for an engine, said regulating means comprising means movable to control the power output of said engine, a pump arranged to be driven by said engine for providing an output pressure which is a function of engine speed, a valve movable to control the application of said pressure for moving said power control means, means for urging said valve in a power increasing direction with a force proportional to said pressure, and means for urging said valve in a power decreasing direction with a force proportional to engine torque.

2. A control system for an engine having a power regulating member; said system comprising a pump arranged to be driven by said engine for providing a fluid pressure which increases with increase in engine speed; a member movable for controlling said power regulating member; first means connected to said movable member and subjected to said pressure for urging said member in a power increasing direction with a force which increases with increase in said pressure; and second means connected to said movable member for urging said member in a power decreasing direction with a force which increases with increase in a condition indicative of engine torque.

3. A control system for an engine having an air intake passage with a valve for controlling the flow through said passage; said system comprising a pump arranged to be driven by said engine for providing a fluid pressure which increases with increase in engine speed; a member movable for controlling the position of said valve; first means connected to said movable member and subjected to said pressure for urging said member in a valve opening direction with a force which increases with increase in said pressure; and second means connected to said movable member for urging said member in a valve closing direction with a force which increases with increase in a condition indicative of engine torque.

4. A control system as recited in claim 3 in which said pump is a positive-displacement-type liquid pump and is provided with a passageway connected between the inlet and outlet ports of said pump; and a variable restriction in said passageway arranged to open with increase in the rate of liquid discharge through said pump for controlling the pump output pressure.

5. A control system for an engine having a power regulating member; said system comprising a hydraulic motor for controlling said member; a pump arranged to be driven by said engine for providing a fluid pressure which increases with increase in engine speed; a valve for controlling the application of said pressure to said motor; and means for urging said valve in a power increasing direction with a force which increases with increase in said pressure.

6. A control system for an engine having a power regulating member; said system comprising a hydraulic motor for controlling said member; a pump arranged to be driven by said engine for providing a fluid pressure which increases with increase in engine speed; a valve for controlling the application of said pressure to said motor; means for urging said valve in a power increasing direction with a force which increases with increase in said pressure; and means for urging said valve in a power decreasing direction with a force which increases with increase in a condition indicative of engine torque.

EROLD F. PIERCE.

REFERENCES CITED

The following references are of record in the file of this patent:

UNITED STATES PATENTS

| Number | Name | Date |
| --- | --- | --- |
| 2,217,364 | Halford et al. | Oct. 8, 1940 |
| 2,303,998 | Holley | Dec. 1, 1942 |
| 2,336,844 | Buck | Dec. 14, 1943 |
| 2,372,989 | Udale | Apr. 3, 1945 |
| 2,383,719 | Halford et al. | Aug. 28, 1945 |
| 2,384,353 | Steiglitz | Sept. 4, 1945 |
| 2,389,003 | Schorn | Nov. 13, 1945 |
| 2,396,618 | Steiglitz et al. | Mar. 12, 1946 |
| 2,403,399 | Reggio | July 2, 1946 |
| 2,405,309 | Jorgensen et al | Aug. 6, 1946 |
| 2,423,417 | Stokes et al. | July 1, 1947 |
| 2,428,531 | Schorn | Oct. 7, 1947 |